Aug. 6, 1935.     J. F. WILLIAMS     2,010,706
FEELER GAUGE
Filed June 17, 1932     3 Sheets-Sheet 1
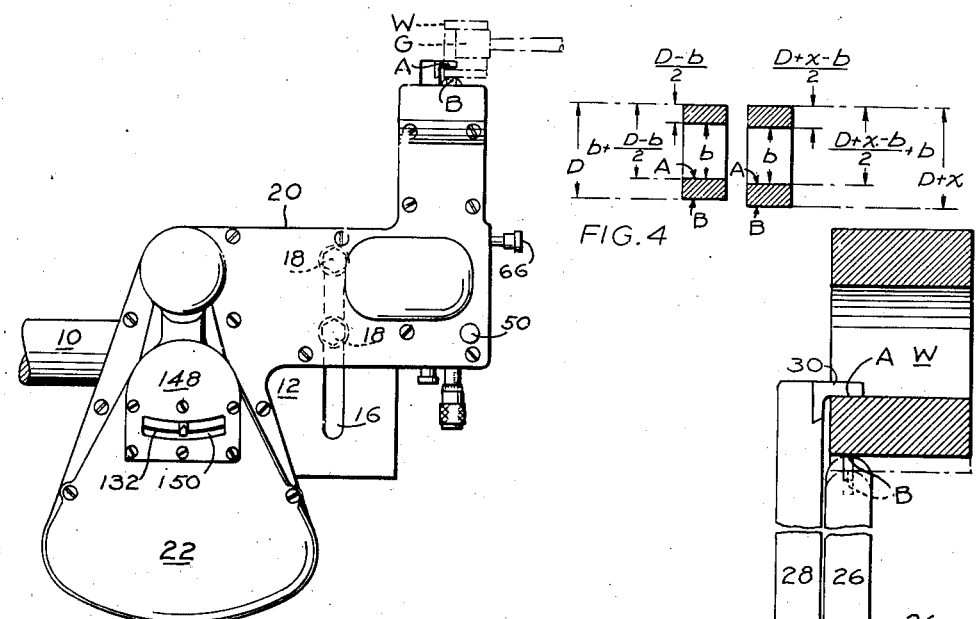
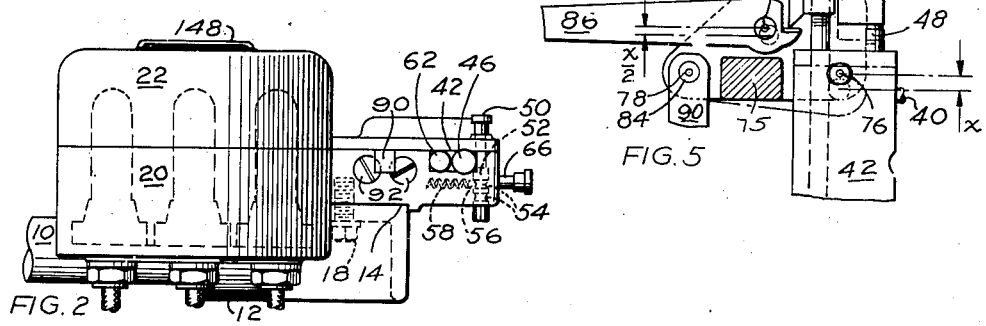
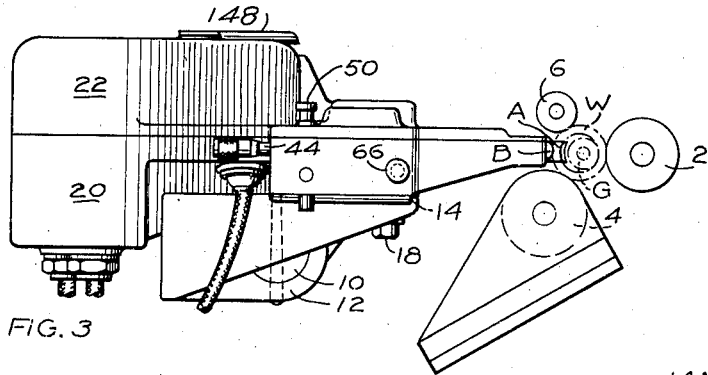
INVENTOR:
JAMES F. WILLIAMS,
BY
Gales P. Moore
HIS ATTORNEY.

Aug. 6, 1935.  J. F. WILLIAMS  2,010,706
FEELER GAUGE
Filed June 17, 1932  3 Sheets-Sheet 2
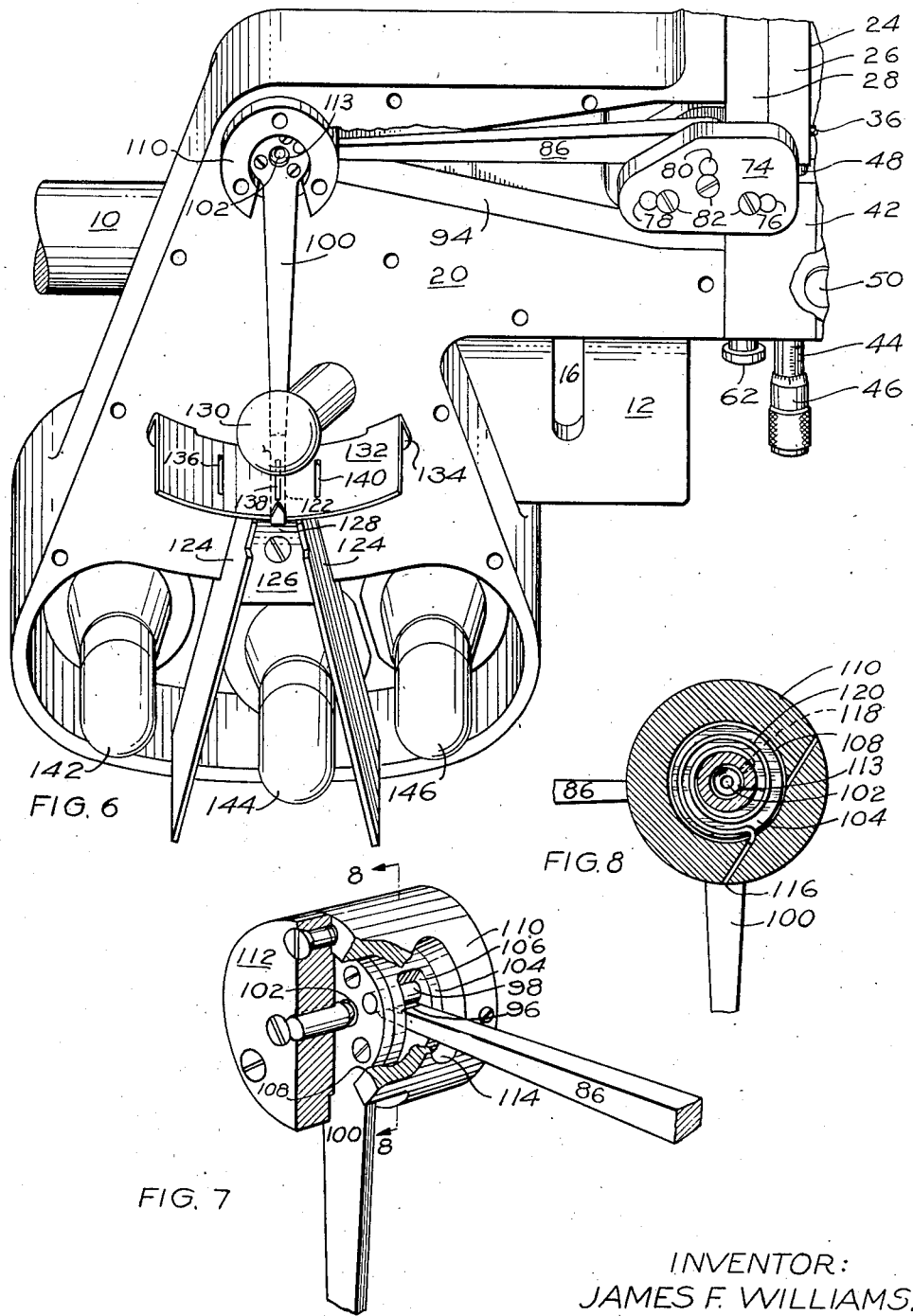
INVENTOR:
JAMES F. WILLIAMS,
BY
Gales P. Moore
HIS ATTORNEY.

Aug. 6, 1935.    J. F. WILLIAMS    2,010,706
FEELER GAUGE
Filed June 17, 1932
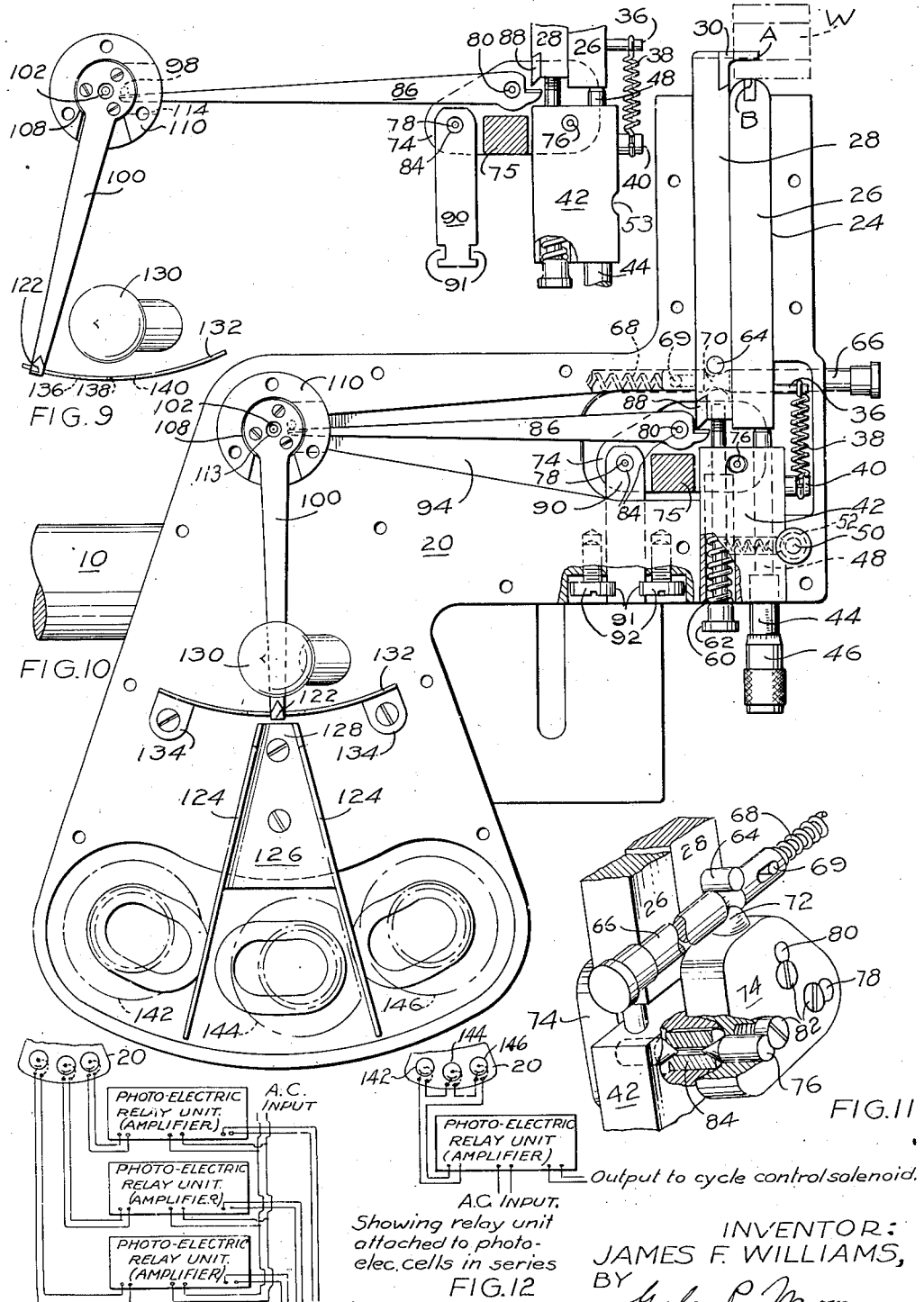
INVENTOR:
JAMES F. WILLIAMS,
BY Gales P. Moore
HIS ATTORNEY.

Patented Aug. 6, 1935

2,010,706

UNITED STATES PATENT OFFICE 2,010,706

FEELER GAUGE

James F. Williams, Arlington, N. J., assignor to General Motors Corporation, Detroit, Mich., a corporation of Delaware Application June 17, 1932, Serial No. 617,992

19 Claims. (Cl. 51—165)

This invention relates to feeler gauges and comprises all of the features of novelty herein disclosed. An object of the invention is to provide an improved feeler gauge especially for controlling machining operations. Another object is to provide a feeler gauge for controlling the size of a bore or other diameter by calipering the wall thickness during the machining operation. Another object to provide a feeler gauge of this character which will control size while neutralizing variations in one of the dimensions of the piece. Still another object is to provide a gauge utilizing the effect of a ray of light to diminish the work or load imposed upon the moving or multiplying parts of gauge. Yet another object is to provide an improved method of gauging.

To these ends and to improve generally upon devices of this character, the invention consists in the various matters hereinafter described and claimed. In its broader aspects, the invention is not necessarily limited to the specific construction selected for illustration in the accompanying drawings.

Fig. 1 is a plan view.

Fig. 2 is a front elevation.

Fig. 3 is a side elevation.

Fig. 4 is a diagrammatic view.

Fig. 5 is a plan view, partly in section, of certain details.

Fig. 6 is a perspective view of a portion of the gauge mechanism, the cover being removed.

Fig. 7 is a perspective view, partly broken away of a pivot structure.

Fig. 8 is a sectional view on the line 8—8 of Fig. 7.

Fig. 9 is a plan view, partly in section, of certain details.

Fig. 10 is a plan view, with parts in section and with the gauge cover removed.

Fig. 11 is a perspective view, partly broken away, of certain details.

Figs. 12 and 13 are diagrammatic views, of alternative constructions.

Although in no wise restricted to such use, the invention finds itself well adapted to control grinding operations according to the cycle illustrated in patent to Williams and Hutchinson, 1,834,755, or in patent to Guild, 1,684,486. The more usual operations in internal grinding are to amplify the stroke of a carriage when a piece is nearly down to size to dress the grinding wheel one or more times, and at the end of the grinding operation to cause the carriage to retreat to a remote position. The extended motions of the carriage are often further controlled by solenoids or magnets which shift a reversing dog and the present invention is adapted for such use, among others.

In the drawings, the letter "W" indicates a sleeve or ring to be internally ground by the grinding wheel "G". Any suitable means may be provided for supporting and rotating the piece but I prefer to use rolls or wheels, one wheel, 2, being a backing or regulating wheel, another wheel, 4, being a supporting idler wheel, and a third wheel, 6, being a pressure wheel. The regulating wheel 2 is desirably driven and the supporting wheel 4 is adjustable along an incline for the purpose of adapting the machine to support work-pieces of all sizes at the same level. The line of contact of the work-piece with the regulating wheel thus gives a constant line or point of reference with respect to which the gauge operates.

A shaft 10 is rigidly supported on the machine frame and is secured by a taper pin to a bracket 12 having ways 14 and a slot 16 traversed by clamping bolts 18 to secure a gauge housing or body 20 in adjusted position, the direction of adjustment being at right angles to the axes of the work-piece, regulating wheel, etc. The gauge housing or body is provided with an upper section or cover 22 fastened to the body by screws.

In the body 20 is a guide groove 24 in which bars 26 and 28 are slidably mounted at right angles to the reference line on the regulating wheel 2. The sliding bar 28 carries an angle piece 30 which has a crescent shaped feeler surface "A" and the sliding bar 26 has an arcuate feeler surface "B". These surfaces are desirably tipped with hard wear-resisting materials such as jewels or metallic carbides and they present opposed points of contact to the wall of the work-piece. Point "A" engages the bore and "B" engages the outside surface, both points lying in a diametral line passing through the race axis of rotation and said line of reference. The points are, therefore, positioned a certain distance apart corresponding to wall thickness of the work-piece, and in functioning the gauge is influenced by changes in wall thickness of the work-piece as material is removed from the bore. However, a feeler controlled linkage and lever system and means for adjustment also serve to control the bore diameter to within very close tolerance of the order of one ten thousandth of an inch through a novel application of the geometrical relation of the elements involved.

The surface of the regulating wheel at the line of contact with the work (which contact line is purposely controlled so as to lie in a plane passed through the axes of both regulating wheel and work-piece by adjusting the guide rolls supporting the work) offers a fixed reference point common to the machine and the work-piece.

Work-pieces are previously finished on outside surfaces before being set-up in the bore cutting machines, but may vary due to the outside diameter tolerances, within a few ten thousandths of an inch. The desired bore size is equal to the nominal or mean outside diameter size minus twice the mean wall thickness. By inserting in the machine a finished master ring of known proper dimensions and adjusting point "B" into contact with the outside surface, the position of "B" becomes a measure of nominal outside diameter of the work-piece.

A pin 36 projecting from the slide bar 26 is connected by a coil spring 38 to a pin 40 projecting from a block 42 which is slidable in a recess of the gauge body. The barrel 44 of a standard micrometer is pressed into an opening of the block, the knurled head 46 serving to adjust the micrometer screw 48 with respect to the barrel and the block, the end of the screw 48 abutting against the slide bar 26. Ordinarily, the block and slide bar slide as a unit but the block can be locked in position by a locking plunger 50 shiftable vertically in a hole in the gauge body and cover. The plunger has a collar 52 (Fig. 2) adapted to enter a shallow recess 53 (Fig. 9) in the side of the block when the plunger is raised but when the plunger is lowered, its stem (of smaller diameter than the collar) releases the block. To hold the plunger in either of its two positions, it is provided with a pair of grooves 54 which are adapted to admit a locking ball 56 urged into the selected groove by a coil spring 58.

The block 42 is provided with a second recess occupied by a coil compression spring 60 which engages a collar 62 on a rod which is secured by threads in the end of the slide bar 28. The spring 60 urges the feeler point "A" against the bore of the work-piece and reacts through the sliding block 42 and micrometer screw 48 to urge the feeler point "B" against the outside of the work-piece. The two points are always on a diametrical line through the axis of the piece and through the above mentioned reference line on the regulating wheel 2.

To retract the feeler points from the work, the following mechanism is provided. A pin 64 projects downwardly at the side of a horizontal plunger 66 which is urged outwardly to inoperative position by a coil spring 68. A stop pin 69 traversing a slot in the plunger limits its outward movement. A conical cam surface 70 on the plunger is arranged to engage the pin 64 and also to engage a button 72 on a floating link 74 which is pivoted at 76 to the block 42. Thus an inward movement of the plunger will cam the slide bar 28 inwardly towards the wheel 2 and cam the slide bar 26 outwardly away from the wheel 2 to permit insertion of a work-piece into grinding and gauging position.

The floating link 74 comprises side cheeks connected by a cross bar 75 (Figs. 5 and 10) and is provided with three pivots 76, 78 and 80. All of these pivots are desirably provided by pairs of cone-pointed pins clamped by screws 82 in holes of the side cheeks and entering tapered holes in bushings 84 carried by three parts to which the link is pivoted. One such part is the block 42, another a lever 86, and another an adjustable slide 90. The short arm of lever 86 is provided with a wear plate engaging a knife-edge plate 88 on the slide bar 28. The slide plate 90 is guided in a recess of the gauge body and is provided with notches 91 engaged by the heads of adjusting screws 92 located in recesses at the front of the gauge body. The screws enter tapped openings in the gauge body and their heads react against opposed walls of the notches to lock the slide plate 90 in adjusted position. The direction of adjustment is perpendicular to the axis of the work-piece and to the reference line on the backing wheel and the adjustment provides for initially setting the pivot 78 in the desired location. The relation of the three pivots is very important in getting the desired ratio of movement of the two feeler points as will later appear.

The lever 86 swings in a recess 94 of the gauge body and its long arm has a wear plate 96 engaging a hardened pin 98 on a multiplying lever 100 which is pivoted at 102 to the gauge body. Any suitable pivot may be used but I prefer to fasten the lever to a pivot block 104 which is notched at one side as at 106 to provide lugs to support the pin 98. The block is carried in a recess 108 of a cylindrical housing 110 fastened to the gauge body and having a cover 112. A slot 114 in the housing serves to admit the end of lever 86 into engagement with the pin 98. The pivot block 104 is supported by cone pointed screws secured in the opposite ends of the housing 110. To urge the pin 98 constantly against the wear piece 96, a light spring is used. This is conveniently done by slitting the housing 110 as at 116 and notching the pivot block 104 as at 118 to receive the bent ends of a spiral spring 120.

The lever 100 carries a shutter 122 provided by a bent-up portion at the end of the lever. The shutter traverses an arcuate path at the entrance to a series of compartments conveniently formed in the gauge body by a pair of partition plates 124 having a connecting web 126 fastened to the gauge body. The partitions converge towards a passage 128 and towards a source of light such as the lamp bulb 130. An arcuate shield 132 is fastened by lugs 134 to the gauge body and excludes light from the compartments except as provided by the slits 136, 138 and 140 and the movable shutter 122. Photoelectric cells 142, 144, 146 are mounted in the compartments and operate successively when a change in the intensity of light reaching them occurs. To permit observing the movement of the shutter 122, its tip is bent over the edge of the shield 132 and a plate 148 (Fig. 1) having a window 150 is fastened to the cover 22 of the gauge body.

The pivot 76 is located just twice as far from pivot 78 as is the pivot 80 measuring in a direction perpendicular to the line of motion of the sliding bars so that the moment arms of pivots 80 and 76 around fixed pivot 78 are in the ratio of one to two. It is therefore evident that the pivot 80 on the link 74 which carries floating multiplying lever 86 will always move ½ the distance (measured in the direction of motion of the sliding bars) as the pivot point 76, it being understood that only a very small angular swing of the link is involved. This satisfies the original geometrical relation between outside diameter, wall and inside diameter since points A and B are displaced by the wall thickness; B is adjusted as a function of outside diameter and (starting from the master ring set-up) the desired bore size will be obtained when points A and B arrive at a certain distance between them, even though the point B may be in contact with a work-piece whose outside diameter is somewhat larger or smaller than that of the set-up master ring originally used to adjust the gauge. In other words, gauge point A influences the bar 28 and multiplying floating lever 86 according to the amount of material thickness removed from the wall of the race, but since the floating lever 86 is also controlled by pivot 80, which is displaced through control of link 74, there is an automatic adjustment every time point B is brought into contact with a work-piece so as to locate link 74 with regard to the actual outside diameter of the work-piece. This compensates for the difference in outside diameters between the new work-piece and the master ring used for set-up so that the progressive movement of the lever system arrives at the final control point for race ring bore size within the desired bore tolerance regardless of outside diameter variation, and through the caliper action on wall thickness only, for each work-piece. The lever 100 projects into the light source chamber, passing beneath the electric light 130 which serves as the source of influencing the photoelectric cells. It is to be understood that lever 100 (or even the lever 86) may be made to make positive electrical contacts if desired, or to operate any type of indicating and control system, inasmuch as the position of this lever relative to the indicator body is a function of wall thickness and bore size of the work-piece. The shutter 122 describes an arcuate path about the pivot 102 and the length of this path is proportional to the length of travel of the gauge point A in contact with the work bore.

When a new work-piece is inserted between gauging points A and B the shutter 122 is in a position to the left of the slot 136 in shield 132. Also sliding bar 28 is initially held away, by the wall being ground, from contact with floating lever 86 inasmuch as the movements of levers 86 and 100 are limited in their arcs of swing as it is their function to register wall size towards the end of the machine cutting cycle when it becomes necessary to cut in the cyclic functions of the machine, as for instance truing of the grinding wheel to permit accurate boring with smooth finish during the removal of the last few thousandths of an inch of material from the bore. During the early part of the cycle while cutting the rough bore, which may be erratic in shape it is advantageous to allow sliding bar 28 to oscillate or slide without moving levers 86 and 100, as these elements are reserved for sensitive action at the end of the cycle after the cutting tool has already smoothed the bore. The electric light 130 is supplied with current from any suitable source. The slots 136, 138 and 140 in shield 132 are located by trial so that they transmit light beams directly to the sensitive elements of the photoelectric cells 142, 144 and 146. The locations of these slots are either adjustable, or varied by total replacement of the shield so as to position the light beams as desired with relation to the positions of the shutter 122. Therefore the openings or slots are subject to adjustment of position along the arcuate path of shutter 122 at the will of the person setting up the machine cycle functions so as to determine the points in the cycle at which control impulses are desired to emanate from the indicator.

One way of translating the position of the gauge points of the indicator into control impulses has been mentioned. The current flowing through photoelectric cells is of too small an order to actuate electro-motive devices of required power as used in actually moving mechanical control parts of a cutting machine. A variety of means already common to the art is available for connection to the photoelectric cells so as to amplify the current variations caused by the influence of light intensity falling upon the sensitive cell elements. In machines whose cycle control unit is of the type actuated by a solenoid plunger, pawl and ratchet wheel or equivalent, the photoelectric cells may be connected in series, so that a common circuit embraces all of the cells, discharging impulses through one amplifier circuit into the electro-motive circuit. This applies only to machine cycles which are continuously progressive and not selective. Where selective control is desired, each photoelectric cell is connected to an individual amplifier circuit which in turn discharges impulses to individual electro-motive elements attached to individual machine control elements. Figure 12 shows an amplifier system with photoelectric cells in series for operating a single progressive cycle control unit.

Figure 13 shows an amplifier system with cells individually connected to separate amplifier circuits attached to individual control elements. The feature of having the multiplying lever do no work except the interruption of a light ray contributes to accuracy as contrasted with gauges wherein the lever trips latches or the like for spring pressed contact making elements. It eliminates wear of parts and pitting of electrical contacts. The feature of controlling bore size by gauging the wall thickness and at the same time neutralizing variations in outside diameter of the piece is however of prime importance whether or not it is accompanied by the other feature. The gauge is not limited to use for internal grinding nor to operations on a hollow piece, the ratio control of feeder points with reference to a line of reference being susceptible of various applications.

Diagrammatic Fig. 4 illustrates in exaggerated degree how the resultant calipering of wall thickness controls the bore size no matter if the external diameters of the pieces vary, and illustrates that the factor which should govern the relative initial adjustment of the inner and outer gauge points is one-half such variation in external diameter. The same bore diameter $b$ is desired for a series of pieces. If a standard or master-piece has an external diameter D the wall thickness is $$\frac{D-b}{2}.$$

Hence the distance from the line of reference on the backing or regulation wheel to the inner gauge point A is $$b+\frac{D-b}{2}.$$

If another piece to be ground to the same bore diameter $b$ has an external diameter $D+x$, the wall thickness is $$\frac{D+x-b}{2}.$$

Hence the distance from the line of reference to the inner gauge point A becomes $$b+\frac{D+x-b}{2}.$$

The distance moved by the inner gauge point A between these two examples is therefore $$b+\frac{D+x-b}{2}-\left(b+\frac{D-b}{2}\right)=$$

$$b+\frac{D}{2}+\frac{x}{2}-\frac{b}{2}-b-\frac{D}{2}+\frac{b}{2}=\frac{x}{2}.$$

And of course the outer gauge point B moves double this distance from the diameter D to the diameter $D+x$. This ratio of movement is provided for by the floating link 74 and its three pivots one of which is equidistant from the other two.

I claim:
1. In a device of the character described, a gauge having feelers riding on two different surfaces of a work-piece, such surfaces being at different distances from the axis of the work-piece, and means controlled by the joint action of the feelers for controlling the sizing of one of such surfaces.

2. In a device of the character described, a gauge having a feeler engaging a surface of a work-piece, a light sensitive element, means actuated by the feeler for altering the intensity of light reaching said element, and means controlled by the element to control a machining operation on the surface.

3. In a device of the character described, a gauge having feelers engaging two different surfaces of a work-piece, a sensitive element, a source of radiant energy, and means controlled by the joint action of the feelers for altering the intensity of emanations proceeding from the source to the element.

4. In a device of the character described, a gauge having a feeler engaging a surface of a work-piece, a source of light, a light sensitive element, a shield having an opening, a shutter actuated by the feeler and moveable over the opening, and means actuated by the light sensitive element for controlling the sizing of the piece.

5. In a device of the character described, a gauge having a pair of opposed feelers engaging the wall of a ring on a diameter thereof, means engaging the work on the same diameter and providing a fixed point of reference, means for guiding the feelers on said diameter, and means controlled by the resultant positions of the feelers for controlling the sizing of the ring.

6. In a device of the character described, a gauge having a pair of opposed feelers engaging a round work-piece, slide bars guiding the feelers along a diameter of the work-piece, a floating link having a supporting pivot and a pivot controlling the position of one of the bars, a multiplying lever actuated by the other bar, a pivot for the lever and carried by the link, and said last pivot being moveable in the direction of movement of the feelers a distance one-half the distance moved by the second mentioned pivot.

7. In a grinding machine, means for supporting and rotating a round work-piece and providing a fixed point of reference, a grinding wheel moveable towards said point of reference, opposed feelers engaging the work-piece and moveable along a diameter projected through said point of reference, and means whereby the relative spacing of the feelers controls the grinding of the piece to size.

8. In a grinding machine, a grinding wheel, a gauge having opposed feelers engaging the exterior and the interior surfaces of a hollow work-piece, means for urging the feelers towards one another along a diameter of the work-piece, and means whereby the feelers control the machining of the bore of the piece to size.

9. In a device of the character described, a gauge having a feeler engaging a surface of a work-piece, a source of light, a light sensitive element, a lever actuated by the feeler and having means for altering the intensity of light reaching said element, and means actuated by the light sensitive element to provide an indication of the size of the work-piece; substantially as described.

10. In a device of the character described, a gauge having a feeler engaging a surface of a work-piece, a source of light, a light sensitive element, a shutter actuated by the feeler and movable between the source and the sensitive element to control the light reaching the element, and means actuated by the element for controlling the sizing of the work-piece; substantially as described.

11. In a device of the character described, a gauge having a feeler engaging a surface of a work-piece, a source of light, a plurality of light sensitive elements, means actuated by the feeler for successively controlling the light reaching the respective elements, and means actuated by the light sensitive elements for controlling the sizing of the work-piece; substantially as described.

12. In a device of the character described, a gauge having a feeler engaging a surface of a work-piece, a source of light, a plurality of light sensitive elements, a casing having compartments for said elements, means actuated by the feeler for successively controlling the light entering said compartments, and means actuated by the light sensitive elements for controlling the sizing of the work-piece; substantially as described.

13. In a device of the character described, a gauge having a feeler engaging a surface of a work-piece, a source of light, a plurality of light sensitive elements, a slotted shield between the light and the sensitive elements, and a shutter actuated by the feeler for successively closing the slots to change the intensity of light reaching the sensitive elements; substantially as described.

14. In a device of the character described, a gauge having a pair of feelers, one of said feelers engaging the external surface of a hollow work-piece, the other feeler engaging the inner surface in opposition to said one feeler, means for urging the feelers towards one another to keep the wall thickness of the piece between them, and means whereby a shifting of one feeler with respect to a point of reference provides for a corrective shifting of the other feeler; substantially as described.

15. In a device of the character described, a gauge having a pair of feelers, one of said feelers engaging the external surface of a hollow work-piece, the other feeler engaging the inner surface in opposition to said one feeler, means for urging the feelers towards one another to keep the wall thickness of the piece between them, and means whereby a shifting of one feeler with respect to a point of reference provides for a corrective shifting of the other feeler, said means comprising a pivoted link having different portions thereof provided with operative connections to the feelers; substantially as described.

16. In a device of the character described, a gauge having a pair of feelers, one of said feelers engaging the external surface of a hollow work-piece, the other feeler engaging the inner surface in opposition to said one feeler, means for urging the feelers towards one another to keep the wall thickness of the piece between them, and means whereby a shifting of one feeler with respect to a point of reference provides for a corrective shifting of the other feeler in a predetermined ratio thereto, said means comprising a movable member having pivots movable in the same ratio and provided with connections to the feelers; substantially as described.

17. In a device of the character described, means for locating a hollow work-piece by engagement with the exterior surface thereof, a feeler engaging said exterior surface in opposition to said means, a second feeler entering the bore of the work-piece and engaging the inner surface at a point in opposition to the first feeler, means for urging said feelers towards one another, and means controlled by the joint action of the feelers on the work-piece for controlling the sizing of the bore; substantially as described.

18. In a device of the character described, a gauge having a pair of feelers, one of said feelers engaging the external surface of a hollow work-piece, the other feeler engaging the inner surface in opposition to said one feeler, a spring reacting between the feelers for urging the feelers towards one another to keep the wall thickness of the piece between them, and a member having a cam for spreading said feelers to move them out of contact with the work-piece; substantially as described.

19. In a device of the character described, a regulating wheel engaging the exterior surface of a hollow work-piece, a grinding wheel entering the bore of the work-piece, said wheels having the wall thickness of the work-piece between them, a pair of opposed feelers having the wall thickness of the work-piece between them, and means whereby the joint action of the feelers controls the grinding of the bore to size; substantially as described.

JAMES F. WILLIAMS.